United States Patent [19]
Guile et al.

[11] 3,948,671
[45] Apr. 6, 1976

[54] SIZE-GRADED QUATERNARY BATCH FOR BONDED BASIC REFRACTORY SHAPES

[75] Inventors: Donald L. Guile, Horseheads; Robert K. Smith, Corning, both of N.Y.

[73] Assignee: Corning Glass Works, Corning, N.Y.

[22] Filed: June 17, 1974

[21] Appl. No.: 480,285

[52] U.S. Cl. .................................. 106/58; 106/63
[51] Int. Cl.² ........................................ C04B 35/04
[58] Field of Search ....................... 106/58, 61, 63

[56] References Cited
UNITED STATES PATENTS

| | | | |
|---|---|---|---|
| 2,572,688 | 10/1951 | Austin | 106/58 |
| 3,141,784 | 7/1964 | King et al. | 106/58 |
| 3,262,795 | 7/1966 | Davies et al. | 106/58 |

Primary Examiner—J. Poer
Attorney, Agent, or Firm—Barry S. Bissell; Richard N. Wardell; Clarence R. Patty, Jr.

[57] ABSTRACT

A refractory of fused or dead-burned dolomitic grain bonded with fine magnesite. The dolomitic grain is divided into three coarse and intermediate particle size fractions in the batch, while the magnesite is alone in the fine fraction. The four particle fractions are separated by three discrete gaps in the size distribution of particles resulting in a burned refractory of high hot strength and corrosion resistance to furnace slags in basic oxygen furnaces. The width of each gap is at least equivalent to the gap created by removing, from a ground raw material batch with continuous particle size distribution, the raw material retained on one primary Tyler sieve after screening (sizing) the batch.

9 Claims, No Drawings

SIZE-GRADED QUATERNARY BATCH FOR BONDED BASIC REFRACTORY SHAPES

BACKGROUND OF THE INVENTION

The basic refractories of the present invention are suitable for use in lining high wear areas of the basic oxygen steelmaking furnaces (BOF). The current practice for lining a BOF requires the use of premium products in the high wear areas to attain a balanced life of all refractories in the furnace. Presently, the premium grade refractories are made from dead-burned magnesite which has been crushed, sized, rebonded by pressing and fired to high temperatures. Penetration by basic slags and metal leading to rapid corrosion of the refractories is reduced by impregnating the refractory shapes with tar or other coal products which will coke when heated. The coking process fills open pores and forms a layer which repels attack by the furnace slags.

Although the tar-impregnated magnesite (in the art and herein used synonymously with magnesia, both terms commonly describing bodies with periclase as the stable crystalline form) have become widely used, there is a continuing interest in decreasing the cost of refractory material consumed per furnace heat or per ton of steel produced. Lower refractory cost per ton of steel can be obtained by replacing current refractories with a cheaper refractory of equivalent life or by replacing with a refractory having superior properties and life which will more than compensate for any greater initial cost.

Of course, a refractory with superior properties and lower cost is always an ultimate goal. With this in mind, experimenters have moved in the direction of dolomite as a replacement or a partial replacement for the MgO in magnesite brick. This replacement accomplishes a cost reduction, because not only is dolomite more readily available commercially, but the energy requirements for one common method of producing high purity magnesite (from magnesium hydrate produced by a treatment of sea water or other brine) are extremely high. In moving toward dolomite as a refractory raw material, we are moving toward the consumption of less energy in both producing the raw material and in burning the refractory.

The use of dolomite, dead-burned dolomite (a mixture of periclase and calcia) or fused dolomite (a resolidified melt of dolomite or equivalent calcia and magnesia) with or without excess magnesia is not without its problems. Perhaps the chief problem involves hydration of the dolomite or dead-burned dolomite grains to form calcium hydroxide with an incident volume expansion and weakening of the body. Fused dolomitic grains have been afforded more attention because of their increased hydration resistance, but they still suffer somewhat from hydration. Accounts of fused dolomitic refractory and grain can be found in U.S. Pat. Nos. 3,540,899 and 3,262,795. Both suggest improvements relating to the art of fusion casting basic refractories.

Finally, the steel production measures of a good refractory (number of heats or tons of steel per brick life) are generally not reproducible in the laboratory for evaluation of samples. Therefore, the properties of corrosion/erosion resistance to synthetic basic slags and hot strength (modulus of rupture, usually at 1340°C unless specified otherwise) provide the quantitative means of comparing laboratory samples. Experience in the art has determined that reliance on these two tests as initial indications of potential furnace life is well founded.

PRIOR ART

Use of fused dolomitic grain (and dead-burned dolomitic grain) bonded with fine magnesite has been suggested by prior experimenters. For example, U.S. Pat. No. 3,262,795 suggests a fused refractory of 50–95% MgO and 5–50% CaO, optionally comminuted and bonded with magnesia fines (reference to the bonding material of U.S. Pat. No. 3,060,000). The patent discloses a size grading of −4+10 mesh (30%), −10+28 (35%) and −28 mesh (35%), preferably 20% of the total batch passing a 325 mesh screen. (For refractories using dead-burned grain see U.S. Pat. No. 3,060,042 and U.S. Pat. No. 3,141,784).

Prevailing standards for raw material particle sizing in the refractory industry prescribe either continuous particle size distribution or gap size distribution in which some particle size fractions are eliminated from the continuous size distribution refractory batch. The present invention is concerned with a triple gap situation in which the four particle size fractions are separated by three discrete gaps, the intermediate gap preferably being the largest. Several references deal with a double gap in their raw material batches, for example see U.S. Pat. No. 2,255,020 (dolomite-magnesia refractory), U.S. Pat. No. 2,252,317 (magnesium orthosilicate refractory) and U.S. Pat. No. 2,572,688 (magnesite refractory). Heuer, in U.S. Pat. Nos. 1,851,181 and 1,992,483, teaches the use of a single large gap in the intermediate range of a continuous size distribution magnesite batch and suggests a batch of 45–65% −3+30 mesh and 35–55% −50 mesh magnesite. Although the present invention preferably includes a large intermediate gap, the inventors also require a quaternary system with two other gaps, whereas Heuer prefers a binary system to avoid intermediate particle interference with his coarse particle-fine particle packing.

SUMMARY

It is the object of the present invention to provide a burned basic refractory which excels in hot strength and corrosion resistance to basic slags in BOF use.

It is another object of the invention to provide such a basic refractory using raw materials which are less expensive than those commonly used in present magnesite refractories used in the BOF.

It is a further object to provide a rebonded fused or dead-burned dolomitic grain refractory with dolomitic grain making up three coarse and intermediate particle size fractions and magnesite making up a fine, bonding fraction.

In particular, it is the object of the present invention to provide a refractory raw material batch with a novel size distribution of particles which when compacted and burned results in a dense, well-bonded refractory of high corrosion resistance and hot strength.

In accordance with the objectives, the invention is a proportioned, size-graded refractory raw material batch and resulting compacted and burned refractory produced therefrom. The batch comprises at least one fused or dead-burned dolomitic grain and a fine grained dead-burned magnesite. The dolomitic grain makes up three particle size fractions, all of which collectively fall substantially in the range −4+65 Tyler mesh and the MgO makes up the single fine fraction which is substantially all −100 Tyler mesh and preferably at least 75% −325 Tyler mesh. The dolomitic grain consists essentially of a fused or dead-burned mixture of, on the oxide basis, 50–67% MgO and 33–50% CaO and preferably at least 98% MgO plus CaO. A fused mixture of 70% dolomite and 30% MgO, resulting in an analytical oxide composition (excluding minor impurities) of 59% MgO and 41% CaO, is preferred. Oxides of magnesium and calcium may be substituted for the dolomite but this negates a cost saving resulting from the use of dolomite as a raw material.

The invention herein is contained in the novel size distribution of raw material particles. Specifically, the basic brick batch of the invention is divided into four size fractions separated by three discrete gaps in the distribution of particles. The minimum size of each gap, in terms of the Tyler sieve series, is equivalent to the size of the gap created by removing from the batch the raw material contained on at least one primary Tyler sieve after screening the raw materials through a complete nest of primary Tyler sieves. By primary sieves, we mean those sieves of the Tyler Standard $\sqrt{2}$ sequence listed in Table I, each of whose openings are related to the next finer screen opening by a factor of $\sqrt{2}$. It is not necessary that the gap occur exactly between identified screens.

TABLE I

| Tyler Screen Series (Primary Sieves) | |
|---|---|
| Mesh Per Inch | Opening Size (Inches) |
| 4 | 0.1852 |
| 6 | 0.1312 |
| 8 | 0.0928 |
| 10 | 0.0656 |
| 14 | 0.0464 |
| 20 | 0.0328 |
| 28 | 0.0232 |
| 35 | 0.0164 |
| 48 | 0.0116 |
| 65 | 0.0082 |
| 100 | 0.0058 |
| 150 | 0.0041 |
| 200 | 0.0029 |

In terms of particle size, the size of the finest particle allowed in any fraction must be at least $\sqrt{2}$ times the size of the coarsest particle allowed in the next finer fraction. Therefore, if the four fractions in the refractory batch are defined as −A+B (coarse fraction), −C+D (coarse-intermediate fraction), −E+F (fine-intermediate fraction) and −G (fine fraction), where A, B, C, D, E, F, G are the increasingly finer sieve openings in inches, then the three gaps (−B+C, −D+E, −F+G) between the four fractions are established by defining the gap end members. Since we want the gap to be at least the equivalent of the gap between two Tyler primary screens, the end members of the gap must be related by at least a factor of $\sqrt{2}$ and therefore: $B \geq \sqrt{2} C$, $D \geq \sqrt{2} E$, $F \geq \sqrt{2} G$. It is preferred that the intermediate of the three gaps be wider than the other two gaps for example such that $D \geq 2 E$.

A preferred particle size distribution is −4+10 (coarse dolomitic grain), −14+20 (coarse-intermediate dolomitic grain), −35+65 (fine-intermediate dolomitic grain) and −100 (fine magnesite). The opening on the 10 mesh screen (0.0656 inch) is $\sqrt{2}$ times the opening on the 14 mesh screen (0.0464 inch), the opening on the 20 mesh screen (0.0328 inch) is 2 times the opening on the 35 mesh screen (0.0164 inches) and the opening on the 65 mesh screen (0.0082 inch) is $\sqrt{2}$ times the opening of the 100 mesh screen (0.0058 inch).

For our purposes in defining the gap in the particle size distribution, we have assumed, in a manner conventional in the art, that the size of the largest particle (or the largest allowed particle) in a fraction is the same as the size of the opening on the finest screen which substantially all particles of the fraction pass and that the size of the finest or smallest particle (or the finest allowed particle) in any fraction is the same as the size of the opening on the coarsest screen which substantially no particles of the fraction pass. With the variance in shape of particles and the realities of screening (sizing) operations, especially on a production basis, some particles with diameters falling within the gaps will nevertheless find their way into the wrong fraction. For example, it would not be unrealistic to find 5% oversize or more commonly undersize particles in a fraction. Therefore, when we speak of the "allowed" size in any fraction, we do so in order to define the desired minimum size particle in any fraction in terms of the desired maximum sized particle in the next finer fraction, thereby also defining the required width of the gap therebetween. When we speak of the "allowed size" then, we mean, for example in the −4+10 fraction, those substantially equiaxial particles with largest diameters of between 0.185 inches and 0.065 inches (the 4 and 10 mesh screen openings in inches), even though we can speculate that there are some few particles larger than 0.185 inches and/or smaller than 0.065 inches in the fraction.

In practice, screening would be completed on the raw materials using the Tyler sieve series of Table I (or equivalent) and each of the three gaps in the size distribution would be created by expelling from the brick batch the raw material retained on at least one sieve.

In preparing a batch for fabrication of refractory bricks, the size graded and proportioned raw materials are blended with a non-aqueous (preferably carbonaceous or waxy) binder and pressed to a green density of 170–190 pounds per cubic foot. Storage containers for both the raw materials and the pressed brick must be dry and sealed from the atmosphere to avoid hydration of the materials. Following brick fabrication and storage, the bricks are fired to 1600°C to bring about the ceramic bond.

PREFERRED EMBODIMENTS

EXAMPLE 1

A number of bricks suitable for use in the crash pad area of a basic oxygen furnace were pressed from a batch of:

| Constituent | Size (Tyler Mesh) | Amount (Percent of the batch) |
|---|---|---|
| Fused dolomitic grain A | −4+10 | 40 |
| Fused dolomitic grain A | −14+20 | 20 |
| Fused dolomitic grain A | −35+65 | 15 |
| Dead-burned Magmaster magnesite | −100 | 25 |

Included in the −100 mesh MgO fraction is 20%, based on the whole batch, of −325 mesh MgO. The size of the tapered brick varied from (in inches) 12 × (6–5) × 3 to 15 × (4 ½ – 3 ¾) × 3.

The dolomitic fused grain A was obtained by crushing an electrically melted, fusion-cast billet produced from a batch of 70% Ohio Lime Company dolomite and 30% Magmaster MgO (Michigan Chemical Corp.). The oxide analysis of the fused grain was MgO 59.3%, CaO 40.3%, $Al_2O_3$ 0.2%, others 0.2% (FeO, $Cr_2O_3$, $SiO_2$). Typical analysis of the magnesite was MgO 98.5%, CaO 0.55%, $SiO_2$ 0.38%, others 0.44% ($Fe_2O_3$, $Al_2O_3$, $B_2O_3$), and LOI 0.13%. Primary crushing of the fused billet was done with jaw crushers and secondary crushing with a hammer mill. Impact-type crushers which produce equiaxial (round) grains are preferred over roll-type crushers which produce sharp, flat particles.

The proportioned raw materials (fused grain and magnesite) were mixed with 7% (by weight) slurried 40% paraffin wax/60% toluol binder at room temperature for about 10 minutes. (This paraffin binder may optionally be 3% by weight at 60°C.) Bricks of the previously mentioned sizes were pressed such that final densities ranged 180–184 lbs/cu. ft.

Firing of the pressed ware was accomplished at 1600°C for 16 hours at peak temperature. A portion of the bricks were tar impregnated using common techniques. Results of hot strength and corrosion resistance of the rebonded grain refractory of the present invention are compared in Table II with a commercial tar impregnated dead-burned magnesite refractory which is currently in steel plant use. The magnesite refractory tested is sold by North American Refractories under the trade name of Nartar P.A.D.

TABLE II

|  | Sized and Rebonded Grain Refractory | Nartar P.A.D. |
|---|---|---|
| Hot Strength (Modulus of Rupture) 1340°C. | 1545 psi | 1280 psi |
| Electric Slag Test |  |  |
| Maximum Cut | 0.34 inch | 0.67 inch |
| % of Nartar P.A.D. | 51% |  |
| Cut Volume | 0.60 cubic inches | 3.5 cubic inches |
| % of Nartar P.A.D. | 17% |  |

The slag test herein is a rather severe procedure devised to determine the relative corrosion resistance of various samples. In general, the particular slag under consideration contacts, for a specified period of time, a rotating laboratory furnace cavity which is constructed from the test refractories. An electric arc maintains the slag at a normal temperature of about 1750°C. The resistance is determined by measuring the depth of the slag cut into the refractory and the volume of refractory eroded (determined by filling the eroded volume with a measured volume of sand). A normalized value of the slag cut for the refractories is generally reported as a percentage of the cut of a standard brick used in the same slag test run. This partially avoids problems in comparing refractories from different test runs. In this particular test the slag had a composition of 20% FeO, 53.5% CaO, 21.5% $SiO_2$ and 5.0% $Al_2O_3$, giving a lime-silica ratio of 2.5.

EXAMPLE 2

Using the pressing procedure of Example 1 several bricks were prepared using grain A (from Example 1) in Series A bricks and grain B in Series B bricks according to the following batch:

| Constituent | Size (Tyler Mesh) | Amount (Percent of the batch) |
|---|---|---|
| Fused dolomitic grain | –4+10 | 40 |
| Fused dolomitic grain | –14+20 | 20 |
| Fused dolomitic grain | –35+65 | 15 |
| Dead-burned Magmaster magnesite | –100 | 25 |

The MgO –100 mesh fraction again includes, based on the whole batch, 20% –325 mesh particles. The dolomitic fused grain B was obtained by crushing an electrically melted, fusion-cast billet produced from a batch of:

| *Ohio Lime Company Dolomite | 92% |
|---|---|
| $CaF_2$ | 5% |
| $Cr_2O_3$ | 3% |

*Typical Analysis: 57.8% CaO, 41.2% MgO, 0.5% $SiO_2$, 0.2% $Fe_2O_3$, 0.15% $Al_2O_3$, 0.15% LOI The four-component, triple-gap refractory batches using dolomitic grains A and B were blended, pressed, dried and fired as in Example 1 and produced burned bricks with low porosity and good slag corrosion resistance and hot strength. The properties were comparable with those of the three component, size graded, bonded refractories of the type disclosed in our concurrently filed U.S. Patent Application Ser. No. 480,284 filed June 17, 1974 and made from identical fused grains; although grain B appeared to produce better brick using the four-component batch. The three-component size distribution was 45% –4+10 mesh dolomitic grain, 25% –28+35 mesh dolomitic grain and 30% –100 mesh MgO. The slag test was conducted as described in Example 1.

TABLE III

|  | 3-Component Rebonded Refractory | | 4-Component Rebonded Refractory | |
|---|---|---|---|---|
|  | Series A "A" Grain (Ave.) | Series B "B" Grain (Ave.) | Series A "A" Grain (Ave.) | Series B "B" Grain (Ave.) |
| Porosity (%) |  |  |  |  |
| Green | 17.0 | 19.5 | 17.0 | 18.6 |
| Fired | 15.3 | 18.3 | 15.3 | 17.7 |
| Hot Strength (psi) |  |  |  |  |
| 1340°C | 510 | 365 | 550 | 740 |
| Slag Resistance |  |  |  |  |
| Cut Depth (inch) | 0.36 | 0.70 | 0.37 | 0.37 |
| Cut Volume (cubic inches) |  | 2.1 |  | 0.90 |

In the foregoing specification, all mesh sizes and screen openings are according to the Tyler series and all percentages are on the weight basis. The choice of the Tyler series is merely exemplary and used for convenience and not for limitation. Any other system may be used which can separate the raw material batch into discrete particle size fractions so that the appropriate fractions may be removed, thereby setting up the three defined gaps in the batch particle size distribution.

We claim:

1. A size-graded batch for the production of basic refractory bodies consisting essentially of, with percentages on the weight basis, a mixture of, dead-burned magnesite and at least one refractory grain consisting essentially of on the oxide basis 50–67% MgO and 33–50% CaO and selected from the group of dead-burned grain and fused grain, 20–30% being a fine magnesite fraction whose particles are substantially all −100 Tyler mesh and composed of said dead-burned magnesite, 10–20% being a fine-intermediate refractory grain fraction whose particles are substantially all in the range of −4+65 Tyler mesh, substantially all at least $\sqrt{2}$ times the size of the largest allowed particle size in said fine magnesite fraction, and composed of said refractory grain, 15–25% being a coarse-intermediate refractory grain fraction whose particles are substantially all in the range of −4+65 Tyler mesh, substantially all at least $\sqrt{2}$ times the maximum allowed particle size in said fine-intermediate refractory grain fraction, and composed of said refractory grain, and 35–45% being a coarse refractory grain fraction whose particles are substantially all in the range of −4+65 Tyler mesh, substantially all at least $\sqrt{2}$ times the maximum allowed particle size in said coarse-intermediate grain fraction, and composed of said refractory grain.

2. The batch of claim 1 wherein at least 75% of the particles in said fine magnesite fraction are −325 Tyler mesh.

3. The batch of claim 1 wherein said refractory grain consist of at least 98% MgO plus CaO.

4. The batch of claim 2 wherein substantially all the particles in said fine-intermediate refractory grain fraction are −35 Tyler mesh and substantially all the particles in said coarse-intermediate refractory grain fraction are +20 Tyler mesh.

5. The batch of claim 1 wherein the particles of said fine-intermediate refractory grain fraction are substantially all −35+65 Tyler mesh, the particles of said coarse-intermediate refractory grain fraction are substantially all −14+20 Tyler mesh, and the particles of said coarse refractory grain fraction are substantially all −4+10 Tyler mesh.

6. The batch of claim 5 wherein at least 75% of the particles in said fine magnesite fraction are −325 Tyler mesh and said refractory grain are fused grain.

7. The batch of claim 6 wherein said refractory grain consists of at least 98% MgO plus CaO.

8. A compacted and burned refractory body composed essentially of the batch of claim 1.

9. A compacted and burned refractory body composed essentially of the batch of claim 7.

* * * * *

UNITED STATES PATENT OFFICE
CERTIFICATE OF CORRECTION

PATENT NO. : 3,948,671
DATED : April 6, 1976
INVENTOR(S) : Donald L. Guile
Robert K. Smith It is certified that error appears in the above-identified patent and that said Letters Patent are hereby corrected as shown below:

Column 3, line 22, after "Standard", insert -- $\sqrt{\phantom{x}}$ -- .

Column 3, line 25, before "2", insert -- $\sqrt{\phantom{x}}$ -- .

Column 3, line 44, after "least", insert -- $\sqrt{\phantom{x}}$ -- .

Signed and Sealed this

Thirteenth Day of July 1976

[SEAL]

Attest:

RUTH C. MASON
*Attesting Officer*

C. MARSHALL DANN
*Commissioner of Patents and Trademarks*